United States Patent
Hermalyn

(10) Patent No.: US 11,002,949 B2
(45) Date of Patent: *May 11, 2021

(54) SINGLE OPTIC FOR LOW LIGHT AND HIGH LIGHT LEVEL IMAGING

(71) Applicant: Waymo LLC, Mountain View, CA (US)

(72) Inventor: Brendan Hermalyn, San Francisco, CA (US)

(73) Assignee: Waymo LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/656,123

(22) Filed: Oct. 17, 2019

(65) Prior Publication Data

US 2020/0049965 A1 Feb. 13, 2020

Related U.S. Application Data

(63) Continuation of application No. 15/856,194, filed on Dec. 28, 2017, now Pat. No. 10,473,903.

(51) Int. Cl.
*G02B 17/08* (2006.01)
*G02B 17/00* (2006.01)
(Continued)

(52) U.S. Cl.
CPC .......... *G02B 17/08* (2013.01); *G02B 17/008* (2013.01); *H04N 5/2254* (2013.01);
(Continued)

(58) Field of Classification Search
CPC .... G02B 17/08; G02B 17/008; H04N 5/2254; H04N 5/2355; H04N 5/2258; B60R 11/04
See application file for complete search history.

(56) References Cited

U.S. PATENT DOCUMENTS

| 7,719,598 B2 | 5/2010 | Ortyn et al. |
| 8,598,559 B2 | 12/2013 | Smith et al. |

(Continued)

FOREIGN PATENT DOCUMENTS

| DE | 10 2011 080407 A1 | 2/2013 |
| KR | 20090124455 | 12/2009 |

OTHER PUBLICATIONS

Sen, Pradeep et al., "Practical High Dynamic Range Imaging of Everyday Scenes: Photographing the world as we see it with our own eyes" IEEE Signal Processing Magazine (2016) vol. 33(5), pp. 1-9.

(Continued)

*Primary Examiner* — Yogesh K Aggarwal
(74) *Attorney, Agent, or Firm* — McDonnell Boehnen Hulbert & Berghoff LLP

(57) ABSTRACT

The present disclosure relates to multiple view optical systems. An example optical system includes at least one primary optical element configured to receive incident light from a scene and a plurality of relay mirrors optically coupled to the at least one primary optical element. The optical system also includes a lens optically coupled to the plurality of relay mirrors, and an image sensor configured to receive focused light from the lens. The image sensor includes a first light-sensitive area and a second light-sensitive area. The primary optical element, the plurality of relay mirrors, and the lens interact with the incident light to form a first focused light portion and a second focused light portion. The first focused light portion forms a first image portion of the scene on the first light-sensitive area and the second focused light portion forms a second image portion of the scene on the second light-sensitive area.

17 Claims, 4 Drawing Sheets

(51) Int. Cl.
   *H04N 5/235*   (2006.01)
   *H04N 5/225*   (2006.01)
   *B60R 11/04*   (2006.01)
(52) U.S. Cl.
   CPC ............ *H04N 5/2355* (2013.01); *B60R 11/04* (2013.01); *H04N 5/2258* (2013.01)

(56) References Cited

U.S. PATENT DOCUMENTS

| | | |
|---|---|---|
| 8,988,539 B1 | 3/2015 | Pascoguin et al. |
| 2003/0048493 A1 | 3/2003 | Pontifex et al. |
| 2012/0249744 A1 | 10/2012 | Pesach et al. |
| 2013/0092819 A1 | 4/2013 | Hall |
| 2014/0267722 A1 | 9/2014 | Riot et al. |
| 2016/0065938 A1 | 3/2016 | Kazemzadeh et al. |
| 2016/0286199 A1* | 9/2016 | Wajs .................. H04N 13/236 |
| 2016/0306149 A1 | 10/2016 | Eisenberg et al. |
| 2017/0019576 A1* | 1/2017 | Pang .................... H04N 5/2353 |
| 2017/0161540 A1* | 6/2017 | Mienko .............. G06K 9/00073 |

OTHER PUBLICATIONS

Aggarwal et al., "Split Aperture Imaging for High Dynamic Range," Proceedings Eighth IEEE International Conference on Computer Vision, ICCV 2001, Jul. 14, 2001, pp. 10-17.

Ho et al., "Baffle Design for a Cassegrain Telescope," 2009 International Conference on Optical Instruments and Technology: Optical Systems and Modern Optoelectronic Instruments, Nov. 20, 2009, pp. 1-10, SPIE vol. 7506.

International Searching Authority, International Search Report and Written Opinion dated Apr. 12, 2019, issued in connection with International Patent Application No. PCT/US2018/066335, filed on Dec. 18, 2018, 9 pages.

* cited by examiner

SINGLE OPTIC FOR LOW LIGHT AND HIGH LIGHT LEVEL IMAGING

CROSS-REFERENCE TO RELATED APPLICATION

The present application claims the benefit of U.S. patent application Ser. No. 15/856,194, filed Dec. 28, 2017, the content of which is herewith incorporated by reference.

BACKGROUND

Unless otherwise indicated herein, the materials described in this section are not prior art to the claims in this application and are not admitted to be prior art by inclusion in this section.

High-dynamic range imaging may be performed by capturing a plurality of image frames of a common scene, each having a different exposure condition. The plurality of image frames may be combined in a tone-mapping process to provide a high-dynamic range image that includes image details of the common scene over a broader dynamic range than otherwise possible with the underlying image sensor.

Alternatively, high-dynamic range imaging may be performed with multiple cameras that could each capture an image of the common scene at an identical or similar time. The images captured by the multiple cameras could be combined in a tone-mapping process.

However, these systems and methods for high-dynamic range imaging may require long exposure times (e.g., to capture a plurality of images) or complex hardware setups (e.g., multiple cameras). Furthermore, conventional techniques may include capturing the multiple images at different times. In such cases, asynchronous image acquisition may pose challenges when capturing rapidly changing scenes.

SUMMARY

The present disclosure relates to multiple view range imaging with optical systems that may include a common optical path and a single image sensor. The optical system may include a primary optical element and one or more reflective relay surfaces configured to split incident light from a common scene so as to be incident on two different optically-sensitive areas on the single image sensor. Such an optical system may provide high-dynamic range, hyperspectral sensing, or other synchronous image capture operations without long exposure times or complex hardware.

In a first aspect, an optical system is provided. The optical system includes at least one primary optical element configured to receive incident light from a scene. The optical system also includes a plurality of relay mirrors optically coupled to the at least one primary optical element. The optical system also includes a lens optically coupled to the plurality of relay mirrors. The optical system also includes an image sensor configured to receive focused light from the lens. The image sensor includes a first light-sensitive area and a second light-sensitive area. A combination of: the at least one primary optical element, the plurality of relay mirrors, and the lens interacts with the incident light so as to form a first focused light portion and a second focused light portion. The first focused light portion forms a first image portion of the scene on the first light-sensitive area. The second focused light portion forms a second image portion of the scene on the second light-sensitive area. The first and second light-sensitive areas are non-overlapping.

In a second aspect, an optical system is provided. The optical system includes a lens body, which includes an opening at a distal end of the lens body. The opening is configured to receive light from a scene. The optical system also includes a primary optical element within the lens body. The optical system further includes a plurality of relay mirrors optically coupled to the primary optical element. The primary optical element is configured to reflect light from the scene toward the plurality of relay mirrors. The plurality of relay mirrors are configured to form respective portions of relay light from the light from the scene. The optical system yet further includes a lens optically coupled to the plurality of relay mirrors and an image sensor with a first light-sensitive area and a second light-sensitive area. The lens interacts with the respective portions of relay light so as to form a first focused light portion and a second focused light portion. The first focused light portion forms a first image portion of the scene on the first light-sensitive area and the second focused light portion forms a second image portion of the scene on the second light-sensitive area. The first and second light-sensitive areas are non-overlapping. The optical system additionally includes a controller having a memory and at least one processor. The controller executes instructions stored in the memory so as to carry out operations. The operations include receiving the first focused light portion at the first light-sensitive area and determining the first image portion based on the received first focused light portion. The operations also include receiving the second focused light portion at the second light-sensitive area. The operations yet further include determining the second image portion based on the received second focused light portion. The operations additionally include determining at least one high-dynamic range image based on the first image portion and the second image portion.

Other aspects, embodiments, and implementations will become apparent to those of ordinary skill in the art by reading the following detailed description, with reference where appropriate to the accompanying drawings.

DETAILED DESCRIPTION

Figure 1:
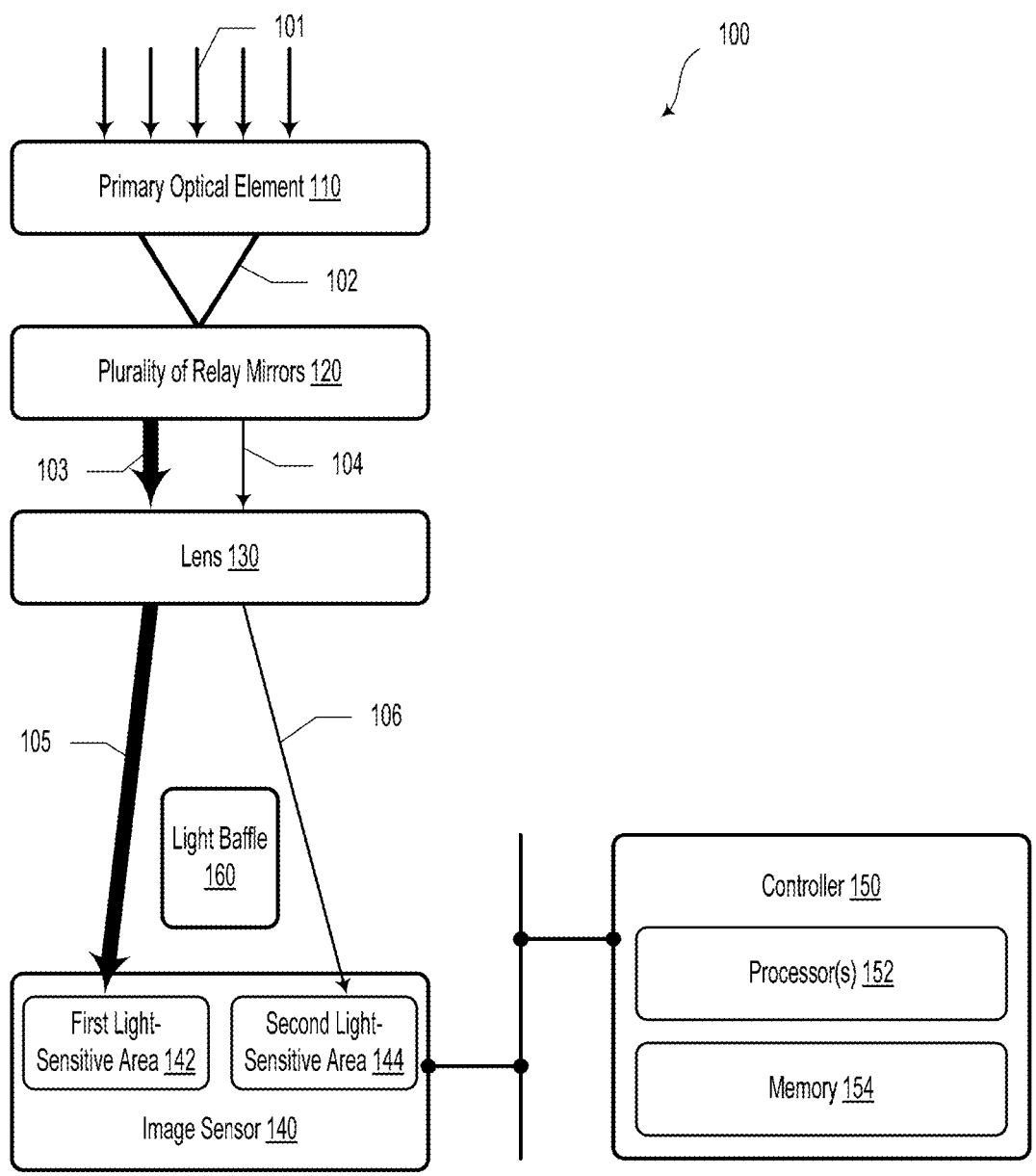
FIG. 1 illustrates an optical system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

To increase the dynamic range of an image capture system, an optical device can be provided that creates two images (e.g., multiple views) of the same scene but with different light intensities or other distinct properties of incident light on two different portions of an image sensor. The optical device could be, for example, an internal beam splitter (e.g., a total internal reflection beam splitter) that includes a 99% reflective surface and a 1% reflective surface. The reflections from these two surfaces can create two separate images of the same scene incident upon the same image sensor, with one image having 1% of the light intensity of the other image. In some embodiments, a device (e.g., a light baffle) that prevents bleeding of light between different regions of the image sensor may be used.

The present disclosure provides multiple views of the same scene. Each of the views could be captured at substantially the same time by the same image sensor, which may have a relatively low dynamic range (as compared to higher-quality image sensors). By utilizing an optical splitter and/or other types of reflective optical elements, multiple views of the same scene could be projected onto the same image sensor.

In some embodiments, each different view of the scene could interact with a different filter (e.g., neutral density, polarization, color, etc.). Such systems could be beneficially utilized to provide desired disparities between color, polarization, etc.

While various applications of such image capture systems are contemplated, specific applications may include imaging systems utilized by autonomous and/or semi-autonomous vehicles. Namely, in driving scenarios, vehicles may encounter high-dynamic range lighting conditions (bright sun and relatively dim traffic light, or dark night and bright oncoming headlights). As such, the single optic, multiple-view optical systems described herein could be incorporated into a vehicle (e.g., coupled to an exterior or interior surface of the vehicle) and may be operable to provide better and/or more reliable identification of objects, hazards, and/or other features in an environment of the vehicle.

II. Example Optical Systems

FIG. 1 illustrates an optical system 100, according to an example embodiment. The optical system 100 includes a primary optical element 110. The primary optical element 110 is configured to receive incident light 101 from a scene.

In an example embodiment, the optical system 100 could include a vehicle. In such a scenario, at least some other elements of optical system 100 could be located on or inside the vehicle, which could include a semi- or fully-autonomous vehicle. For instance, some elements of the optical system 100 could be fixedly or removeably attached to a roof, side mirror, front, side, rear, or any other exterior portion of the vehicle. Additionally or alternatively, some elements of the optical system 100 could be coupled to an interior surface or portion of the vehicle. In an example embodiment, some elements of the optical system 100 could be fully or partially attached to an interior cabin of the vehicle and may be arranged to have a forward-facing field of view with respect to a driving direction of the vehicle. Other attachment locations and/or field of view orientations are contemplated.

The optical system 100 also includes a plurality of relay mirrors 120 that are optically coupled to the primary optical element 110. The optical system 100 additionally includes a lens 130 optically coupled to the plurality of relay mirrors 120. Yet further, the optical system 100 includes an image sensor 140 configured to receive focused light from the lens 130.

In some embodiments, the primary optical element 110 could include a reflective surface (e.g., such as a mirror) that can reflect the incident light 101 in a desired manner (e.g., toward the plurality of relay mirrors 120). In an example embodiment, the primary optical element 110 could be disposed within a lens tube or lens body in an annular arrangement along an inner wall of the lens tube. In such a scenario, the reflective surface of the primary optical element 110 could be angled so as to reflect the incident light 101 toward the plurality of relay mirrors 120. However, other arrangements or dispositions of the primary optical element 110 are possible and contemplated. Furthermore, while some embodiments in this disclosure may include a single primary optical element, other embodiments may include a plurality of primary optical element. While the primary optical element 110 is described herein as possibly including one or more reflective surfaces, it will be understood that the primary optical element 110 could be another type of optical element configured to direct incident light toward the plurality of relay mirrors 120. As such, the primary optical element 110 could include one or more optical fibers, prisms, waveguides, lenses, among other possibilities.

In some examples, the primary optical element 110 and the plurality of relay mirrors 120 could be arranged about a common optical axis. In such a scenario, the primary optical element 110 could include an angled annular mirror surface configured to reflect light toward the plurality of relay mirrors 120.

The plurality of relay mirrors 120 can include respective reflective surfaces, which could be configured to direct respective portions of relay light (e.g., first relay light 103 and second relay light 104) toward the lens 130.

In some embodiments, the respective reflective surfaces of the plurality of relay mirrors 120 and the primary optical element 110 could be formed with a metallic coating or a high-reflection (HR) dielectric coating (e.g., a periodic stack of alternating high- and low-index of refraction material). In some scenarios, an anti-reflection (AR) coating may be applied to the respective reflective surfaces and/or other optical elements described in the present disclosure.

The image sensor 140 includes a first light-sensitive area 142 and a second light-sensitive area 144. The respective light-sensitive areas of the image sensor 140 could include a plurality of light-sensitive elements (e.g., pixels). In such a scenario, at least one pixel of the plurality of pixels could include: a complementary metal-oxide semiconductor (CMOS) sensor, a charge-coupled device (CCD) sensor, a silicon photomultiplier (SiPM), a single photon avalanche detector (SPAD), or an avalanche photoconductor. Other types of light-sensitive elements, or more generally, electromagnetic spectrum-sensitive elements (e.g., micro-bolometers), are possible and contemplated in relation to the present disclosure.

The first light-sensitive area 142 could encompass a first plurality of pixels and the second light-sensitive area 144 could encompass a second plurality of pixels. In some embodiments, a third plurality of pixels could be arranged between the first plurality of pixels and the second plurality of pixels. That is, the third plurality of pixels could include pixels of the image sensor 140 that are in an intervening area between the first light-sensitive area 142 and the second light-sensitive area 144.

In some embodiments, the image sensor 140 could include a relatively low-dynamic range image sensor compared to the scene to be imaged. In such a scenario, the scene could include a wide dynamic range spanning multiple octaves, and may even be discontinuous. For example, the scene could range from 5-1000 lux in one region of the scene and range from 5000-6000 lux in other regions of the scene. As an example, the bright portions of the scene could correspond to a bright daytime sky. In such a scenario, the relative dim portions of the scene could correspond to shadowed ground or other dark objects. It will be understood that other light levels are possible and contemplated herein.

In an example embodiment, a combination of: the primary optical element 110, the plurality of relay mirrors 120, and the lens 130 interacts with the incident light 101 so as to form a first focused light portion 105 and a second focused light portion 106. The first focused light portion 105 forms a first image portion of the scene on the first light-sensitive area 142. The second focused light portion 106 forms a second image portion of the scene on the second light-sensitive area 144. The first light-sensitive area 142 and the second light-sensitive area 144 are non-overlapping.

In some embodiments, the plurality of relay mirrors 120 includes a first reflective surface and a second reflective surface. In such a scenario, the first light-sensitive area 142 receives the first focused light portion 105 via the first reflective surface and the second light-sensitive area 144 receives the second focused light portion 106 via the second reflective surface. In some cases, the first reflective surface can have a higher reflectivity than the second reflective surface, or vice versa.

In some examples, the optical system 100 may include a light baffle 160 between the first light-sensitive area 142 and the second light-sensitive area 144. The light baffle 160 could include, for example, an opaque material configured to absorb or block light. The light baffle 160 could be located between the first light-sensitive area 142 and the second light-sensitive area 144. In such a scenario, the light baffle 160 could include a wall portion between the respective light-sensitive areas. However, the light baffle 160 could take other shapes and forms.

In various embodiments, the first focused light portion 105 has a first light intensity and the second focused light portion 106 has a second light intensity. In such a scenario, the first light intensity could be at least ten times greater than the second light intensity. For example, the second light intensity could be about one percent of the first light intensity. Other light intensity differences—both smaller and larger—are possible and contemplated in the present disclosure.

In scenarios where the optical system 100 is coupled to a vehicle, the image sensor 140 could be operable to capture images of at least a portion of an environment of the vehicle.

The optical system 100 could also include a controller 150. In an example embodiment, the controller 150 could include at least one processor 152 and a memory 154. The controller 150. The controller 150 may include a computer disposed on a vehicle, an external computer, or a mobile computing platform, such as a smartphone, tablet device, personal computer, wearable device, etc. Additionally or alternatively, the controller 150 may include, or be connected to, a remotely-located computer system, such as a cloud server. In an example embodiment, the controller 150 may be configured to carry out some or all of the operations as various blocks or steps described herein.

As an example, the at least one processor 152 may execute instructions stored in the memory 154 so as to carry out certain operations. The operations may include some or all of the functions, blocks, or steps described herein. In some embodiments, different computing devices or controllers may carry out the various functions, blocks, or steps described herein, in various combinations.

The operations could include receiving the first focused light portion 105 at the first light-sensitive area 142. In other words, a portion of the incident light 101 from the scene could be reflected by the primary optical element 110 as reflected light 102 toward at least one relay mirror of the plurality of relay mirrors 120. The at least one relay mirror could reflect first relay light 103 toward the lens 130. An interaction between the first relay light 103 and the lens 130 could form the first focused light portion 105. The first focused light portion 105 could be directed toward, and/or be incident on, the first light-sensitive area 142. Receiving the first focused light portion 105 at the first light-sensitive area 142 could include actuating a physical (mechanical) shutter and/or triggering an electronic shutter corresponding to the first light-sensitive area 142.

The operations could also include determining the first image portion based on the received first focused light portion 105. Put another way, the image sensor 140 and the controller 150 could form the first image portion based on the light received at the first light-sensitive area 142.

The operations can additionally include receiving the second focused light portion 106 at the second light-sensitive area. In other words, a portion of the incident light 101 from the scene could be reflected by the primary optical element 110 as reflected light 102 toward at least one relay mirror of the plurality of relay mirrors 120. The at least one relay mirror could reflect second relay light 104 toward the lens 130. An interaction between the second relay light 104 and the lens 130 could form the second focused light portion 106. The second focused light portion 106 could be directed toward, and/or be incident on, the second light-sensitive area 144. Receiving the second focused light portion 106 at the second light-sensitive area 144 could include actuating a physical (mechanical) shutter and/or triggering an electronic shutter corresponding to the second light-sensitive area 144.

The operations can yet further include determining the second image portion based on the received second focused light portion 106. Put another way, the image sensor 140 and the controller 150 could form the second image portion based on the light received at the second light-sensitive area 144.

In an example embodiment, the image sensor 140 could be configured to acquire the first image portion and the second image portion at substantially the same time. That is, the first image portion could be acquired over the same time period as that of the second image portion. Alternatively, the first image portion could be acquired during a time period that partially-overlaps with the time period during which the second image portion is acquired. In other words, the first image portion and the second image portion could, but need not, be acquired during respective non-overlapping time periods.

In an example embodiment, the first image portion and the second image portion could include information about a substantially common scene and could be stored as an image data file. The image data file could be arranged in an image file format, such as RAW, JPEG, TIF, Graphical Interchange Format (GIF), MPEG, or another type of image file format.

The operations also include determining at least one high-dynamic range image based on the first image portion and the second image portion.

The first image portion, the second image portion, and/or the at least one high-dynamic range image could be stored in the memory 154. Additionally or alternatively, the first image portion, the second image portion, and/or the at least one high-dynamic range image could be transmitted and/or stored elsewhere.

In some embodiments, the optical system 100 could additionally or alternatively include at least one filter. The at least one filter could include at least one of: a neutral density filter, a polarizing filter, a spectral filter, a band pass filter, a low-pass filter, or a high-pass filter. Other types of transmissive or reflective optical filters or optical elements configured to interact with light are contemplated in the present disclosure.

In such a scenario, the at least one filter could be configured to filter at least one of: the first focused light portion or the second focused light portion.

Furthermore, the at least one filter could be optically coupled to at least one of: the image sensor, the lens, the at least one primary optical element, or the plurality of relay mirrors.

Figure 2A:
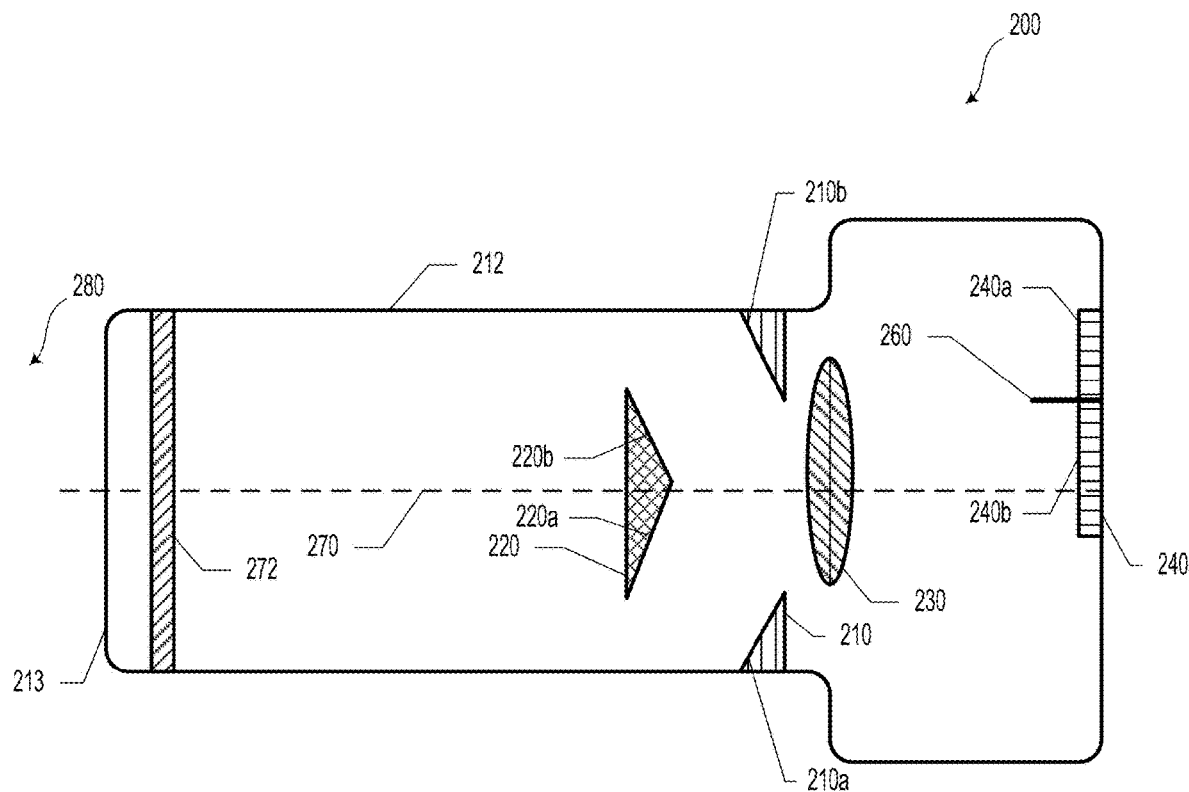
FIG. 2A illustrates an optical system, according to an example embodiment.
Figure 2B:
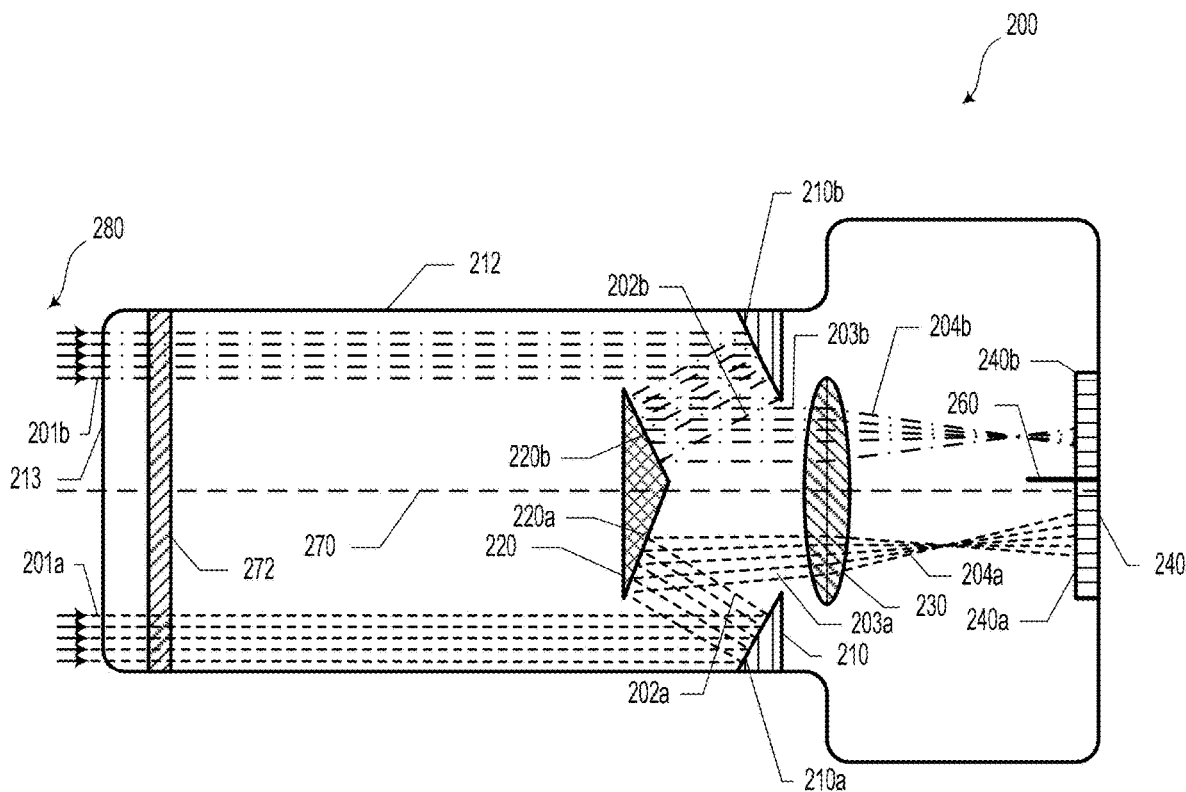
FIG. 2B illustrates an optical system, according to an example embodiment.

FIGS. 2A and 2B illustrate an optical system 200, according to an example embodiment. Referring first to FIG. 2A, optical system 200 could include a body configured to protect and/or house at least some elements of optical system 200. For example, a portion of the body could include a lens body 212.

A portion of the lens body 212 could include an opening 213. The opening 213 could be at a distal end of the lens body 212. The opening 213 could be configured, positioned, and/or shaped so as to receive light from a scene 280. The scene 280 could be a portion of the environment outside the optical system 200. Namely, the scene 280 could include a field of view of the optical system 200.

The optical system 200 could also include a primary optical element 210 within the lens body 212. In some embodiments, the primary optical element 210 could include a reflective surface (e.g., surfaces 210a and 210b).

The optical system 200 could additionally include a plurality of relay mirrors 220 and at least one lens 230 within the lens body 212. The plurality of relay mirrors 220 are optically coupled to the primary optical element 210 and the at least one lens 230. For example, incident light reflected from the surface 210a of primary optical element 210 could be directed toward—and interact with—a first relay mirror surface 220a of the plurality of relay mirrors 220. Likewise, incident light reflected from the surface 210b of primary optical element 210 could be directed toward a second relay mirror 220b of the plurality of relay mirrors 220. While only two "pairs" of primary optical element surfaces and relay mirrors are illustrated in FIGS. 2A and 2B, it will be understood that additional "pairs" of primary optical element surfaces and relay mirrors are possible and contemplated within the context of this disclosure.

In some embodiments, the respective reflective properties of surfaces 220a and 220b may be different. For example, surface 220a could have a normalized reflectance of nearly 1 (e.g., 0.98) and surface 220b could have a normalized reflectance of 0.02. It will be understood that surfaces 220a and 220b could have varying normalized reflectance values between 1 and 0. Furthermore, the respective reflectance values of surfaces 220a and 220b could vary based on a characteristic of incident light, such as wavelength or polarization. For example, at least one of surface 220a or 220b could be configured to reflect a desired wavelength or waveband of light at a different reflectance value as compared to other wavelengths or wavebands of light. As a result of the differing reflectance values of surfaces 220a and 220b, differing intensities of reflected light could be provided to the respective portions of image sensor 240.

For example, the primary optical element 210 and/or the plurality of relay mirrors 220 could be arranged in a continuous or discontinuous annular arrangement with respect to an optical axis 270 of the optical system 200. For example, the primary optical element 210 could include a continuously curving mirror angled inward so as to reflect incident light toward the optical axis and the plurality of relay mirrors 220. Similarly, the plurality of relay mirrors 220 could include a continuous surface or discontinuous set of surfaces that are angled away from the optical axis 270 so as to reflect light towards the lens 230.

The optical system 200 includes an image sensor 240. The image sensor 240 could include a first light-sensitive area 240a and a second light-sensitive area 240b. In an example embodiment, the first light-sensitive area 240a and the second light-sensitive area 240b do not spatially overlap.

The image sensor 240 could include at least one of: a CMOS sensor, a CCD sensor, a silicon photomultiplier (SiPM), a single photon avalanche detector (SPAD), or an avalanche photoconductor. Furthermore, the image sensor 240 could include an array of light-sensitive devices or pixels. As described elsewhere herein, the image sensor 240 could be configured to capture an image from the first light-sensitive area 240a and the second light-sensitive area 240b over substantially the same time period. In an example embodiment, during an image capture period, the first light-sensitive area 240a may be operated using a different gain setting (e.g., ISO or sensitivity) as compared to the second light-sensitive area 240b. Other ways to adjust the exposure between the first light-sensitive area 240a and the second light-sensitive area 240b are contemplated herein.

In an example embodiment, the plurality of relay mirrors 220 can be optically coupled to the primary optical element 210. Additionally, the primary optical element 210 could be configured to reflect light from the scene 280 toward the plurality of relay mirrors 220. In such a scenario, the plurality of relays mirrors 220 is configured to form respective portions of relay light from the light from the scene 280. The relay light may be directed toward the lens 230. In some embodiments, the lens 230 could be configured to focus the relay light onto and/or direct the relay light towards the image sensor 240.

In some embodiments, the optical system 200 could include a light baffle 260. The light baffle 260 could include one or more light-absorbing "walls" or portions. The light baffle 260 could be disposed between the first light-sensitive area 240a and the second light-sensitive area 240b. The light baffle 260 could be configured to prevent stray light from "leaking" between the respective light-sensitive areas of image sensor 240 or between portions of the optical system 200. Additionally or alternatively, the optical system 200 could include other elements configured to reduce stray light, modify or shape a light field, and/or reduce ghost reflections. Such other elements could include further baffles, stops, mirrors, lens, coatings, light guides, optical fibers, or other optical materials.

In some embodiments, the optical system 200 may include a filter 272. Although FIGS. 2A and 2B illustrate filter 272 as being near a distal end of the lens body 212, other locations for filter 272 are possible and contemplated herein. For example, filter 272 could be coupled to one or more surfaces of the primary optical element 210 and/or one or more surfaces of the plurality of relay mirrors 220. In some embodiments, filter 272 could interact with light received by the first light-sensitive area 240a, but not with light received by the second light-sensitive area 240b, or vice-versa.

FIG. 2B illustrates optical system 200, according to an example embodiment. FIG. 2B is similar to FIG. 2A but also illustrates example light rays that approximate certain light paths in the optical system 200.

The opening 213 may be configured to receive incident light from the scene 280. While the incident light may enter the lens body 212 through the entire area of the opening 213, for clarity only two portions of incident light—a first incident light portion 201a and a second incident light portion 201b—are illustrated here. It will be understood that other incident light portions may be received by optical system 200 and the present disclosure contemplates all other such portions.

In an example embodiment, the first incident light portion 201a may interact with the primary optical element 210. For instance, the first incident light portion 201a may be reflected by surface 210a and directed toward the plurality of relay mirrors 220 as reflected light 202a. Namely, the reflected light 202a could interact with the first relay mirror surface 220a.

In such a scenario, the first relay mirror surface 220a could reflect light toward the lens 230 as relay light portion 203a. The lens 230 could interact with the relay light portion 203a so as to focus the relay light portion 203a to provide first focused light portion 204a. The first focused light portion 204a may be directed toward the first light-sensitive area 240a of image sensor 240.

Similarly, the second incident light portion 201b may interact with the primary optical element 210. For instance, the second incident light portion 201b may be reflected by surface 210b and directed toward the plurality of relay mirrors 220 as reflected light 202b. The reflected light 202b could interact with the second relay mirror surface 220b.

In such a scenario, the second relay mirror surface 220b could reflect light toward the lens 230 as relay light portion 203b. The lens 230 could interact with the relay light portion 203b so as to focus the relay light portion 203b and form second focused light portion 204b. The second focused light portion 204b may be directed toward the second light-sensitive area 240b of image sensor 240.

The first focused light portion 204a can form a first image portion of the scene 280 on the first light-sensitive area 240a and the second focused light portion 204b can form a second image portion of the scene 280 on the second light-sensitive area 240b. In some embodiments, the first focused light portion 204a could have a first light intensity and the second focused light portion 204b has a second light intensity. In such a scenario, the first light intensity is at least ten times greater than the second light intensity. Correspondingly, the first image portion could represent a much brighter image of the scene 280 as compared to the second image portion.

In some embodiments, the optical system 200 may include a controller (not illustrated in FIG. 2A or 2B). The controller could include a memory and at least one processor. The controller executes instructions stored in the memory so as to carry out operations. The operations could include receiving the first focused light portion 204a at the first light-sensitive area 240a. The operations can also include determining the first image portion based on the received first focused light portion 204a. The operations yet further include receiving the second focused light portion 204b at the second light-sensitive area 240b. The operations could also include determining the second image portion based on the received second focused light portion 204b.

In example embodiments, the controller could be operable to determine at least one high-dynamic range image based on the first image portion and the second image portion. For instance, determining at least one high-dynamic range image based on the first image portion and the second image portion could include application of at least one of: a non-linear tone-mapping algorithm, a non-linear radiance-mapping algorithm, or a color appearance model. It will be understood that other ways to combine the first image portion and the second image portion so as to provide a high-dynamic range image are possible. For example, the high-dynamic range image may include fewer under- or over-exposed areas as compared to either the first or second image portions. The high-dynamic range image could provide greater detail than either the first image portion or the second image portion in certain areas of the image or under certain operating conditions. For example, the high-dynamic range image could provide higher quality object identification information in very bright (e.g., full sun, looking into the sun, actively illuminated scenes, etc.) or very dark (night) imaging scenarios. Other high dynamic range scenes such as a night scene with bright headlights or a bright day scene with relatively dim traffic lights are also contemplated. That is, the first image portion and the second image portion could be combined or otherwise utilized in such a manner so as to provide more reliable or less ambiguous object identification information.

It will be understood that, while a "first image portion" and a "second image portion"—and their combination—are described herein, other numbers of images and/or image portions are possible. For example, a plurality of light-sensitive areas on the image sensor 240 could be utilized so as to provide a corresponding plurality of image portions. At least some of the plurality of image portions could be combined so as to form the high-dynamic range image.

Furthermore, while simultaneous image capture of the first image portion and the second image portion is contemplated, other image capture sequences are possible. For example, the first and second image portions could be captured at different times under different lighting or image capture (e.g., exposure) conditions. Also, burst imaging modes are contemplated within the scope of the present disclosure. That is, a plurality of images could be captured in an image burst (e.g., images captured in quick temporal succession). At least some of the plurality of images could be combined to provide the high-dynamic range image described herein. Additionally or alternatively, the system and operations described herein could provide a plurality of high-dynamic range images—such as a high-dynamic range image set or video stream.

Figure 3:
FIG. 3 illustrates a composite image, according to an example embodiment.

FIG. 3 illustrates a composite image 300, according to an example embodiment. The composite image 300 includes a first image portion 310 and a second image portion 320. The first image portion 310 could include a generally-overexposed image of an outdoor scene. The second image portion 320 could include a generally-under-exposed image of the outdoor scene. In other words, the composite image 300 could include the first image portion 310 and the second image portion 320 as being in different non-overlapping locations in the composite image 300. Alternatively or additionally, the composite image 300 could include the first image portion 310 and the second image portion 320 as being at least partially overlapping.

As described herein, information from the first image portion 310 and the second image portion 320 could be combined or otherwise manipulated so as to provide a high-dynamic range image. For example, in the present scenario, the high-dynamic range image could provide accurate color information for the illuminated traffic lights, increased detail in the over-exposed regions of the first image portion 310, and increased detail in the under-exposed regions of the second image portion 320. Other ways to obtain high-dynamic range information by combining or otherwise utilizing a plurality of images of the same scene are contemplated herein.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, a physical computer (e.g., a field programmable gate array (FPGA) or application-specific integrated circuit (ASIC)), or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. An optical system comprising:
   at least one primary optical element configured to receive incident light from a scene;
   a plurality of relay mirrors optically coupled to the at least one primary optical element;
      wherein the plurality of relay mirrors includes a first reflective surface and a second reflective surface; and
      wherein the first reflective surface has a higher reflectivity than the second reflective surface;
   a lens optically coupled to the plurality of relay mirrors; and
   an image sensor configured to receive focused light from the lens, wherein the image sensor comprises a first light-sensitive area and a second light-sensitive area, wherein a combination of: the at least one primary optical element, the plurality of relay mirrors, and the lens interacts with the incident light so as to form a first focused light portion and a second focused light portion, wherein the first focused light portion forms a first image portion of the scene on the first light-sensitive area and wherein the second focused light portion forms a second image portion of the scene on the second light-sensitive area, wherein the first focused light portion has a first light intensity and wherein the second focused light portion has a second light intensity, wherein the first light intensity is different than the second light intensity.

2. The optical system of claim 1, wherein the optical system further comprises a vehicle, and wherein the image sensor is operable to capture images of at least a portion of an environment of the vehicle.

3. The optical system of claim 1, wherein the image sensor comprises a plurality of pixels, wherein at least one pixel of the plurality of pixels comprises: a CMOS sensor, a CCD sensor, a silicon photomultiplier (SiPM), a single photon avalanche detector (SPAD), or an avalanche photoconductor.

4. The optical system of claim 1, wherein the at least one primary optical element and the plurality of relay mirrors are arranged about a common optical axis.

5. The optical system of claim 4, wherein the at least one primary optical element comprises an annular mirror surface configured to reflect light toward the plurality of relay mirrors.

6. The optical system of claim 1, wherein the first light sensitive area receives the first focused light portion via the first reflective surface and the second light-sensitive area receives the second focused light portion via the second reflective surface.

7. The optical system of claim 1, further comprising a light baffle between the first light-sensitive area and the second light-sensitive area.

8. The optical system of claim 1, wherein the first light-sensitive area encompasses a first plurality of pixels and the second light-sensitive area encompasses a second plurality of pixels, and wherein a third plurality of pixels is arranged between the first plurality of pixels and the second plurality of pixels.

9. The optical system of claim 1, further comprising a controller, wherein the controller executes instructions so as to carry out operations, the operations comprising:
   receiving the first focused light portion at the first light-sensitive area;
   determining the first image portion based on the received first focused light portion;
   receiving the second focused light portion at the second light-sensitive area;

determining the second image portion based on the received second focused light portion; and determining at least one composite image based on the first image portion and the second image portion.

10. The optical system of claim 1, further comprising at least one filter, wherein the at least one filter comprises at least one of: a neutral density filter, a polarizing filter, a spectral filter, a band pass filter, a low-pass filter, or a high-pass filter.

11. The optical system of claim 10, wherein the at least one filter is configured to filter at least one of: the first focused light portion or the second focused light portion.

12. The optical system of claim 10, wherein the at least one filter is coupled to at least one of: the image sensor, the lens, the at least one primary optical element, or the plurality of relay mirrors.

13. An optical system, comprising:
a lens body comprising an opening configured to receive light from a scene;
a primary optical element within the lens body;
a plurality of relay mirrors optically coupled to the primary optical element, wherein the primary optical element is configured to reflect light from the scene toward the plurality of relay mirrors, wherein the plurality of relay mirrors are configured to form respective portions of relay light from the light from the scene;
a lens optically coupled to the plurality of relay mirrors;
an image sensor with a first light-sensitive area and a second light-sensitive area, wherein the lens interacts with the respective portions of relay light so as to form a first focused light portion and a second focused light portion, wherein the first focused light portion forms a first image portion of the scene on the first light-sensitive area and wherein the second focused light portion forms a second image portion of the scene on the second light-sensitive area; and
a controller comprising a memory and at least one processor, wherein the controller executes instructions stored in the memory so as to carry out operations, the operations comprising:
receiving the first focused light portion at the first light-sensitive area;
determining the first image portion based on the received first focused light portion;
receiving the second focused light portion at the second light-sensitive area;
determining the second image portion based on the received second focused light portion; and
determining at least one composite image based on the first image portion and the second image portion.

14. The optical system of claim 13, wherein the first focused light portion has a first light intensity and wherein the second focused light portion has a second light intensity, wherein the first light intensity is at least ten times greater than the second light intensity.

15. The optical system of claim 14, wherein determining at least one composite image based on the first image portion and the second image portion comprises applying at least one of: a non-linear tone-mapping algorithm, a non-linear radiance-mapping algorithm, or a color appearance model.

16. The optical system of claim 13, wherein the image sensor comprises at least one of: a CMOS sensor, a CCD sensor, a silicon photomultiplier (SiPM), a single photon avalanche detector (SPAD), or an avalanche photoconductor.

17. The optical system of claim 13, further comprising a light baffle between the first light-sensitive area and the second light-sensitive area.

* * * * *